(12) United States Patent
Miyashita et al.

(10) Patent No.: US 7,652,693 B2
(45) Date of Patent: Jan. 26, 2010

(54) PORTABLE TELEPHONE CAPABLE OF RECORDING A COMPOSITE IMAGE

(75) Inventors: Akihiro Miyashita, Kawasaki (JP);
Kiyoshi Nakanishi, Kawasaki (JP);
Toshiyuki Tsumura, Yokohama (JP)

(73) Assignee: Panasonic Corporation, Osaka (JP)

( * ) Notice: Subject to any disclaimer, the term of this patent is extended or adjusted under 35 U.S.C. 154(b) by 554 days.

(21) Appl. No.: 10/529,407

(22) PCT Filed: Jul. 1, 2003

(86) PCT No.: PCT/JP03/08376

§ 371 (c)(1),
(2), (4) Date: Jun. 2, 2005

(87) PCT Pub. No.: WO2004/032487

PCT Pub. Date: Apr. 15, 2004

(65) Prior Publication Data

US 2005/0221857 A1    Oct. 6, 2005

(30) Foreign Application Priority Data

Sep. 30, 2002   (JP)   ............... 2002-286403

(51) Int. Cl.
*H04N 5/262* (2006.01)
(52) U.S. Cl. .................... 348/239; 348/218.1
(58) Field of Classification Search ............ 348/239, 348/218.1, 333.11, 333.12, 584; 382/209; 715/723
See application file for complete search history.

(56) References Cited

U.S. PATENT DOCUMENTS 6,195,513 B1    2/2001   Nihei et al.
(Continued)

FOREIGN PATENT DOCUMENTS

EP    0 860 980 A2    8/1998
(Continued)

OTHER PUBLICATIONS

Machine English Translation of JP 2001-285420 A (Japanese document published on Oct. 12, 2001).*
(Continued)

*Primary Examiner*—Lin Ye
*Assistant Examiner*—Nelson D. Hernández Hernández
(74) *Attorney, Agent, or Firm*—Pearne & Gordon LLP (57) ABSTRACT

An object of the invention is to provide a mobile telephone capable of generating a highly flexible composite image for the user. The mobile telephone of the invention includes image memory (16) for recording a base image, mask image memory (17) in which a plurality of types of mask image data representing mask images to specify the combining positions of combination object images with each base image and the image pickup areas when the combination object images are picked up by a camera section (11) are stored corresponding to the base images, and a CPU (12) for reading the mask image data selected by the user from the mask image memory (17), displaying the mask image based on the read mask image data on a display section (15), recording the image to be combined, picked up based on the displayed mask image in RAM (14), combines the recorded image to be combined at the combining position of the base image specified by the selected mask image data, and recording a composite image resulting from the combining in the image memory (16).

6 Claims, 5 Drawing Sheets

U.S. PATENT DOCUMENTS

| | | | |
|---|---|---|---|
| 6,621,524 B1 * | 9/2003 | Iijima et al. | 348/584 |
| 2003/0025808 A1 | 2/2003 | Parulski et al. | |

FOREIGN PATENT DOCUMENTS

| JP | 64-7766 | 1/1989 |
|---|---|---|
| JP | 10-108128 | 4/1998 |
| JP | 11-8831 | 1/1999 |
| JP | 3058664 | 3/1999 |
| JP | 11-187314 | 7/1999 |
| JP | 2001-45352 | 2/2001 |
| JP | 2001285420 A * | 10/2001 |

OTHER PUBLICATIONS

European Search Report for corresponding application EP03738620, Jul. 31, 2009.

* cited by examiner

PORTABLE TELEPHONE CAPABLE OF RECORDING A COMPOSITE IMAGE

TECHNICAL FIELD

This invention relates to a mobile telephone having an image pickup unit and a base image and including an image processing function of combining a picked-up image picked up by the image pickup unit and the base image to generate a composite image.

BACKGROUND ART

Hitherto, an image processing apparatus for setting an image fit frame on a management sheet made up of code information of text, a line, etc., and image data and fitting an image based on image data photographed with a camera into the setup image fit frame, thereby generating a management sheet on which the images are combined has existed (for example, refer to patent document 1).

A digital camera capable of performing thinning processing, etc., for a plurality of images picked up by an image pickup device and combining the images to reproduce the images as one image has existed (for example, refer to patent document 2).

In recent years, a mobile telephone with a camera has become explosively widespread and it has been made possible to use an image picked up by the camera as a standby screen or wallpaper of the mobile telephone. Some mobile telephones enable the user to pick up an image of a subject with the camera with a predetermined frame image displayed on a display, and an image into which the image picked up by the camera and the frame image are combined can be used as a standby screen or wallpaper.

A person who has a small child, a pet, etc., often carries a photo of his or her child or pet entered in a pocketbook, etc., about himself or herself because of setting much value on the child or pet. In recent years, a mobile telephone with a camera has become widespread as described above and therefore a person carries a mobile telephone with a camera and uses the child or pet image picked up by the camera as a standby screen, etc., whereby a similar situation to that in which the person carries the photo can be produced. The possibility that the standby screen of the mobile telephone will be frequently seen is high and the image can be easily seen as compared with a pocketbook, etc. Thus, it is considered that it is highly convenient to carry the child or pet image using a mobile telephone with a camera.

[Patent document 1]

JP-A-01-007766

[Patent document 2]

JP-A-10-108128

However, if an attempt is made to take a photo of a family with a frame image displayed on a display as formerly, for example, four subjects of mother, father, baby, and pet dog must be photographed in the same image pickup area (portion except the frame image on the display).

With the mobile telephone, if an attempt is made to pick up the faces of the parents of adults and the faces of the baby and the dog within the same image pickup area as in the example, the faces vary in size because the size of the image pickup area is limited (the display size of the mobile telephone is limited). Thus, although the image is an important family image, the photographed baby and dog faces are small and are not clearly seen, resulting in an unsatisfactory image. On the other hand, if an attempt is made to photograph the baby and dog faces large, any other member of the family may be excluded from the image pickup area.

The mobile telephone in the related art enables the user to use an image into which an image picked up by the camera and a frame image are combined as a standby screen or wallpaper, but the person who carries the child or pet image as described above would want to be able to add even slight change to the image displayed on the display of the mobile telephone. For example, it is considered that the frame image is changed from one season to another, etc.

If the user attempts to change the frame image to a different frame image, the mobile telephone in the related art enables the user to change the frame image only to a fixed frame image recorded in the mobile telephone or a frame image downloaded through the Internet, etc.; a standby screen and a wallpaper image using an original frame image for each user of the mobile telephone cannot be created.

It is therefore an object of the invention to provide a mobile telephone having an image processing function capable of generating a highly flexible composite image.

DISCLOSURE OF THE INVENTION

A mobile telephone of the invention is a mobile telephone including an image pickup unit and a base image record section for recording a base image, and having an image processing function of combining a picked-up image picked up by the image pickup unit and the base image to generate a composite image, the mobile telephone including: a composite image record section which records the composite image; a mask image data record section which records a plurality of types of mask image data representing mask images to specify a combining position of a combination object image as a picked-up image to be combined with the base image on the base image and an image pickup area for picking up the combination object image by the image pickup unit, the mask images corresponding to the base image; a reading unit which reads the mask image data selected from among the plurality of types of mask image data from the mask image data record section; a display unit which displays the mask image based on the mask image data read by the reading unit on a display; a combination object image holding unit which holds the combination object image which is picked up in accordance with the mask image displayed on the display; an image combining unit which combines the combination object image held by the combination object image holding unit with the base image at the combining position specified by the mask image data; and a recording unit which records a composite image combined by the image combining unit in the composite image record section.

According to the configuration, the base image and mask image data are combined as desired, whereby the contents of the base image can be changed by the combining position of the image to be combined, specified by the mask image data and the image pickup area in picking up the image to be combined. Thus, as many composite images as the number of base image and mask image data combinations can be generated, making it possible to generate a highly flexible composite image.

In the mobile telephone of the invention, the display unit displays a preview image generated by combining the mask image and the base image on the display when the display unit displays the mask image on the display.

According to the configuration, the user picks up the image to be combined while seeing the preview image displayed on the display, so that the user can pick up the image to be combined while imaging an image provided by combining the image to be combined with the base image, and the operability in generating a composite image is improved.

In the mobile telephone of the invention, the plurality of types of mask image data recorded in the mask image data record section include the mask image data representing a plurality of types of mask images corresponding to the base image. The display unit displays the plurality of types of mask images based on the mask image data one at a time on the display until the combination object image which is picked up in accordance with the mask image is held by the combination object image holding unit. The combination object image holding unit holds the plurality of combination object images which are picked up in accordance with the plurality of types of mask images displayed on the display. The image combining unit combines each of the plurality of combination object images, held by the combination object image holding unit, with the base image at the combining position based on the mask image to specify the image pickup area of the combination object image.

According to the configuration, the mask image data recorded in the mask image data record section includes the mask image data representing a plurality of types of mask images, and a plurality of combination object images, picked up based on the plurality of types of mask images based on the mask image data are combined at the combining positions on one base image.

Thus, a different image pickup condition can be given to each of the plurality of combination object images with the base image, so that if the combination object images, of the picked-up images of subjects different in size are combined with the same base image, a composite image where all subjects can be clearly recognized can also be generated.

In the mobile telephone of the invention, the display unit displays a preview image generated by combining the base image and the each of the plurality of mask images on the display when the display unit displays each of the plurality of mask images on the display.

According to the configuration, the user picks up the image to be combined while seeing the preview image displayed on the display, so that the user can pick up the image to be combined while imaging an image provided by combining the image to be combined with the base image, and the operability in generating a composite image is improved.

In the mobile telephone of the invention, when the combination object image which is picked up based on each of a plurality of types of image pickup areas specified by the mask image data is already held in the combination object image holding unit, the display unit combines the held combination object image with the base image at the combining position based on the mask image to specify the image pickup area for picking up the held combination object image and displays the composition image on the display.

According to the configuration, the image to be combined, picked up and then retained by the above-mentioned combination object image holding unit is combined with the preview image displayed when another image to be combined is picked up for display. Thus, the user can pick up the image to be combined while checking both of the image to be combined, already picked up and the image pickup area to pick up the image. Therefore, the image pickup condition of the next image to be combined can be changed, etc., in response to the contents of the image to be combined, already picked up, making it possible to generate a more highly flexible composite image.

In the mobile telephone of the invention, whenever the image pickup unit picks up an image based on the mask image displayed on the display and the picked-up combination object image is held by the combination object image holding unit, the image combining unit combines the held combination object image with the base image in order. After the image combining unit combines all the combination object images with the base image, the recording unit records a composite image provided by the image combining unit in the composite image record section.

According to the configuration, whenever an image to be combined is picked up and the picked-up combination object image is held by the combination object image holding unit, the combination object image is combined with the base image in order. Thus, the processing time until a composite image is generated can be shortened as compared with the case where all combination object images are retained by the combination object image holding unit before they are combined with the base image together.

In the mobile telephone of the invention, when a picking up of the combination object image to be combined with the base image is canceled on the way, the image combining unit combines the combination object image, which is picked up by the image pickup unit and which is held by the combination object image holding unit before the picking up of the image is canceled, with the base image.

According to the configuration, the number of the combination object images with one base image can be decreased in midstream, so that a more highly flexible composite image can be generated.

In the figures, numeral 1 denotes a mobile telephone, numeral 11 denotes a camera section, numeral 12 denotes a CPU, numeral 13 denotes ROM, numeral 14 denotes RAM, numeral 15 denotes a display section, numeral 16 denotes image memory, numeral 17 denotes mask image memory, numeral 18 denotes an operation section, numeral 19 denotes a bus, and a to g denote mask images.

BEST MODE FOR CARRYING OUT THE INVENTION

An embodiment of the invention will be discussed with reference to the accompanying drawings.

A mobile telephone according to the embodiment of the invention has a camera and has a function of combining a picked-up image picked up by the camera and a previously recorded image to generate a composite image. In the mobile telephone, the operation mode for generating a composite image is defined as image combining mode.

Figure 1:
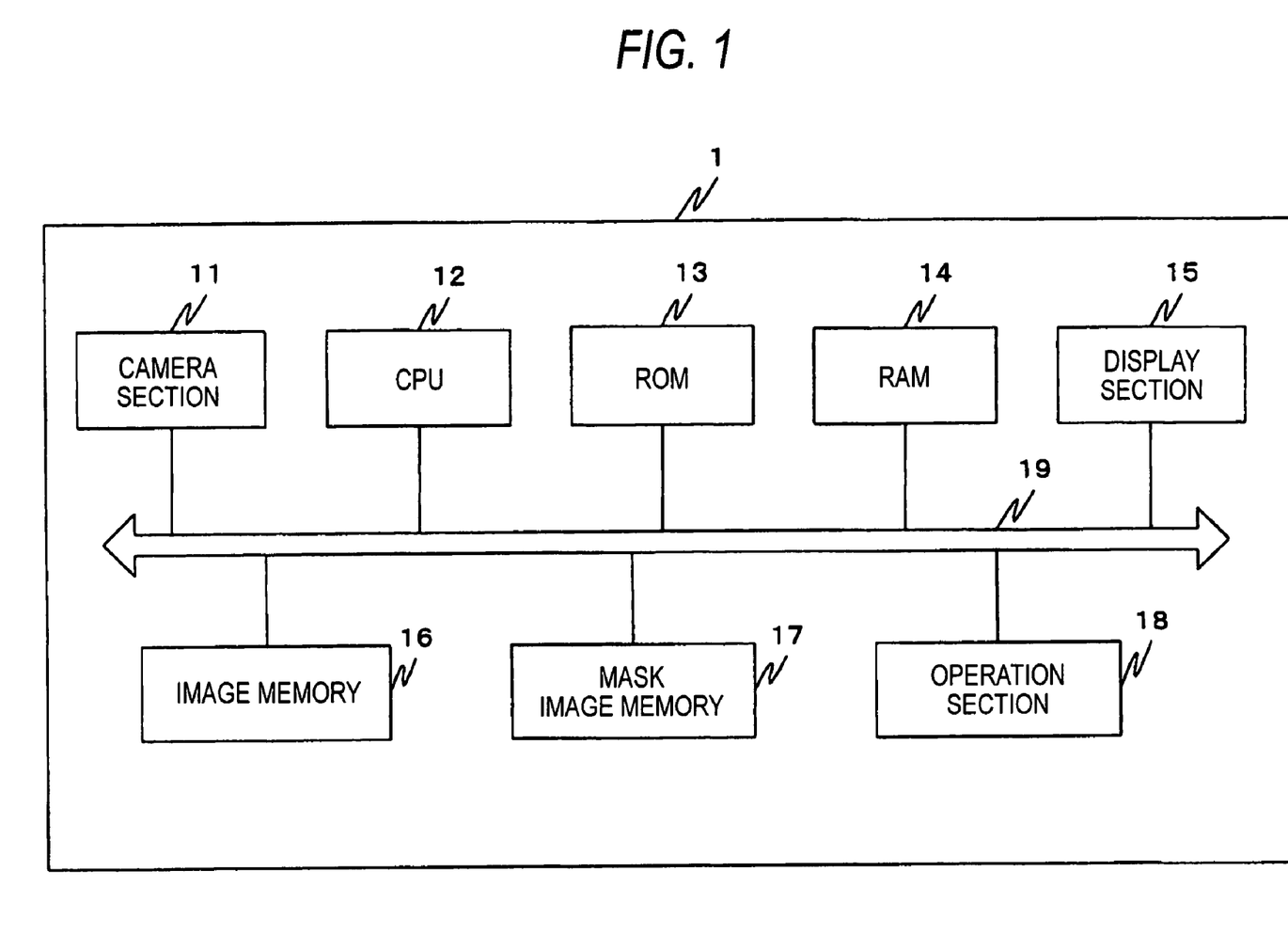
FIG. 1 is a block diagram to show the configuration of a mobile telephone according to an embodiment of the invention.

FIG. 1 is a block diagram to show the configuration of the mobile telephone according to the embodiment of the invention.

As shown in the figure, the mobile telephone 1 includes a camera section 11 (an image pickup unit), a CPU (a central processing unit) 12, a ROM (Read Only Memory) 13, a RAM (Random Access Memory) 14, a display section 15, an image memory 16 (base image record section and composite image record section), a mask image memory 17 (mask image data record section), an operation section 18, and a bus 19. The CPU 12 corresponds to a reading unit, a display unit, a combination object image holding unit, an image combining unit, and a recording unit.

The camera section 11 is made up of an image pickup device such as a CCD, an image processing IC for performing image processing of an image picked up by the image pickup device, and the like, and temporarily stores the image after subjected to the image processing in the RAM 14 under the control of the CPU 12.

The CPU 12 controls the sections in the mobile telephone 1 based on an image combining program stored in the ROM 13 for performing image combining processing.

The ROM 13 stores the image combining program used by the CPU 12 and various programs required for the operation of the mobile telephone 1.

The RAM 14 is memory used as work memory for the image combining processing of the CPU 12 and an area for temporarily storing the image picked up in the camera section 11 and expanding a composite image.

The display section 15 is made up of a liquid crystal display such as an LCD and the like and displays the image picked up in the camera section 11 and information such as various operation menus of the mobile telephone 1 for the user under the control of the CPU 12.

A download image downloaded through a network such as the Internet via a communication section not shown, a fixed image previously contained in the memory, an image picked up in the camera section 11, a composite image generated after the CPU 12 performs image combining processing, and the like are recorded in the image memory 16 under the control of the CPU 12.

The images recorded in the image memory 16 are used as base images when a composite image is generated and therefore in the description to follow, the images recorded in the image memory 16 are defined as base images. The composite image generated after the CPU 12 performs image combining processing may be recorded in different image memory provided in the mobile telephone 1 rather than in the image memory 16.

A plurality of types of mask image data representing mask images to specify the combining positions of picked-up combination object images with each base image (which will be hereinafter referred to as combination object images) and the image pickup areas when the combination object images are picked up by the camera section 11 are recorded in the mask image memory 17. The mask images corresponds to the base images recorded in the image memory 16.

Figure 2:
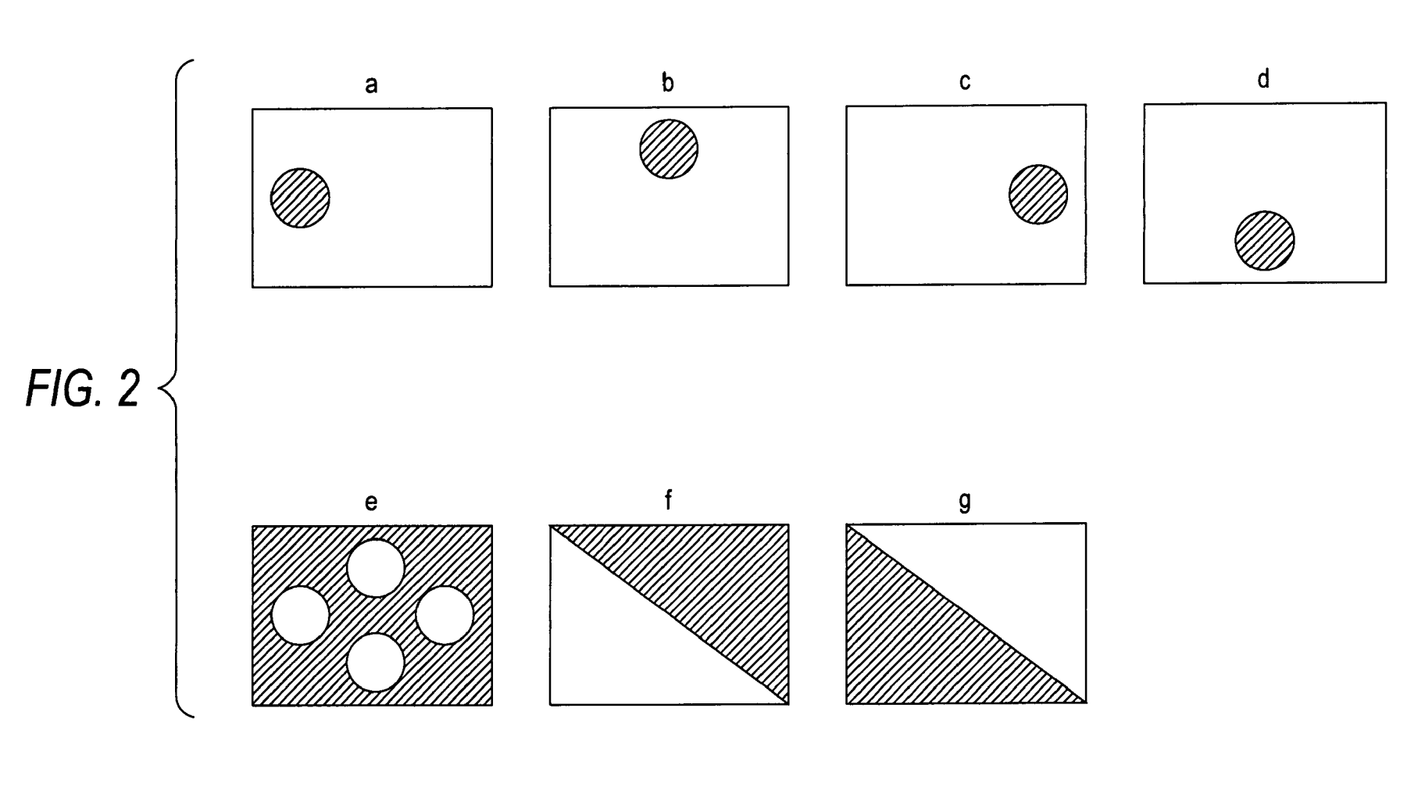
FIG. 2 is a drawing to show examples of mask images based on mask image data recorded in mask image memory of the mobile telephone according to the embodiment of the invention.

FIG. 2 is a drawing to show examples of mask images based on the mask image data recorded in the mask image memory 17. In the figure, each area displayed in different color (gray area) is the combining position and the image pickup area mentioned above. When a composite image is generated, the user of the mobile telephone 1 can select any of the mask images based on the mask image data recorded in the mask image record section 17 by operating the operation section 18.

Four mask images a to d shown in FIG. 2 are recorded in the image memory 16 as one mask image data representing the four mask images which are corresponded to the same base image. That is, if the user selects the mask image with the four mask images a to d as one set, four combination object images, picked up based on the image pickup areas specified by the four mask images a to d are combined at the combining positions specified by the mask images on one base image. Of course, the user can also select a single mask image of a to d rather than one set of a to d.

Mask image e shown in FIG. 2 is provided by inverting gray and white areas of mask image formed when the mask images a to d are combined. Mask images f and g are also provided by inverting gray and white areas.

The operation section 18 has keys, buttons, etc., and provides an input unit for the user to enter a photograph command given to the camera section 11 and select the mask image to be used in generating a composite image. As the user operates the operation section 18, operation information is transferred to the CPU 12, which then executes the given instruction.

The bus 19 connects the camera section 11, the CPU 12, the ROM 13, the RAM 14, the display section 15, the image memory 16, the mask image memory 17, and the operation section 18 and is a general term for an address bus for transferring an address signal, a control bus for transferring a control signal, and a data bus for transferring various pieces of data.

Figure 3:
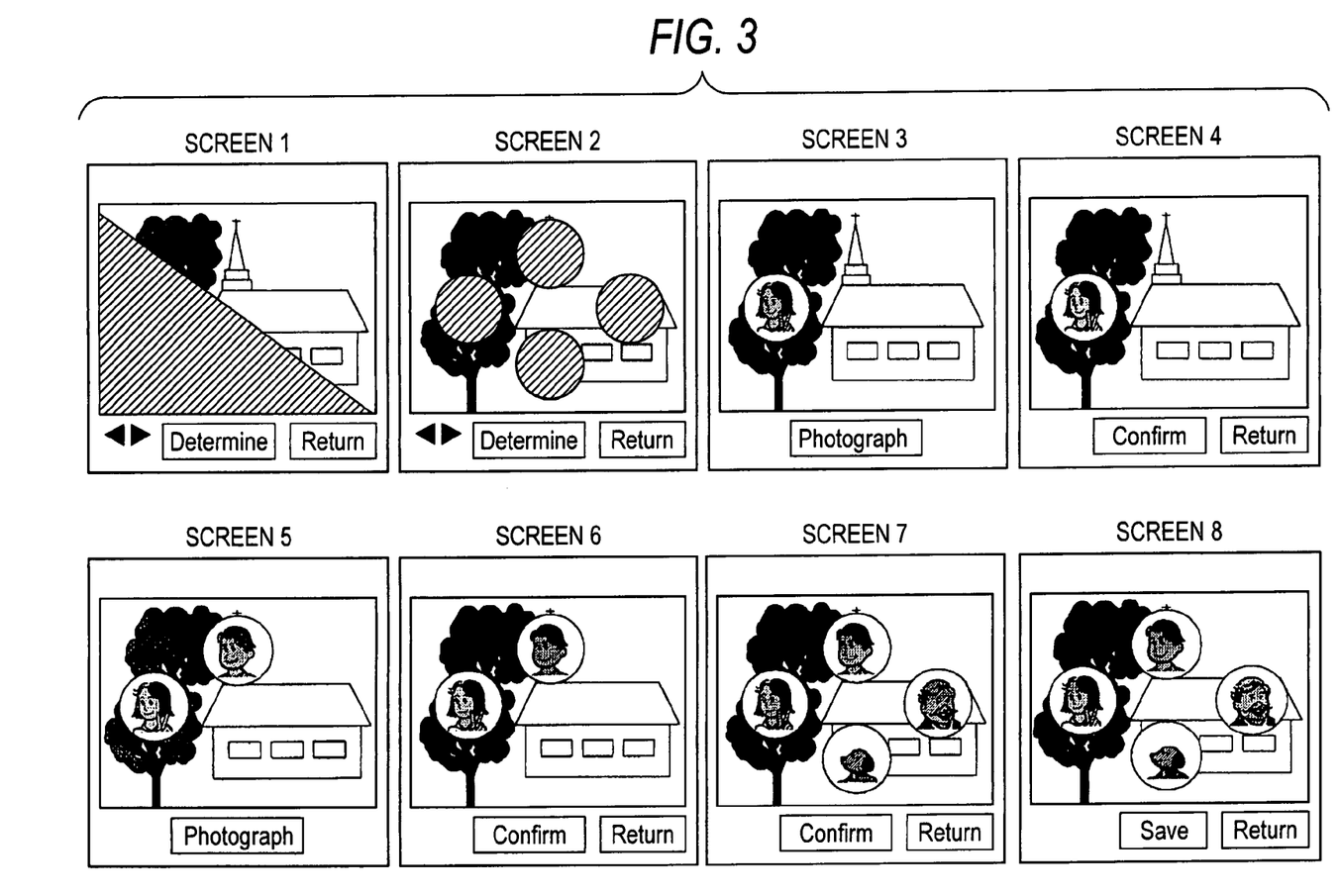
FIG. 3 is a drawing to describe display screen examples displayed on a display section in an image combining mode of the mobile telephone according to the embodiment of the invention.
Figure 4:
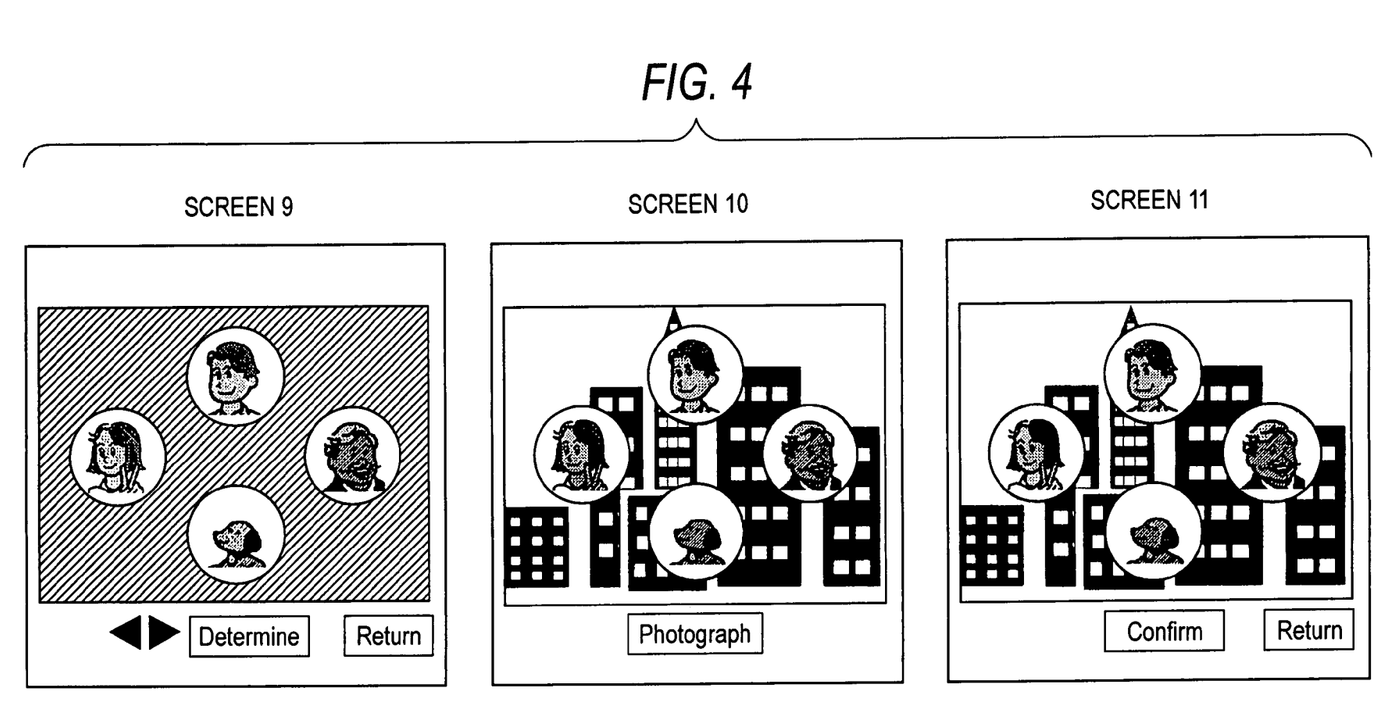
FIG. 4 is a drawing to describe display screen examples displayed on the display section in the image combining mode of the mobile telephone according to the embodiment of the invention.
Figure 5:
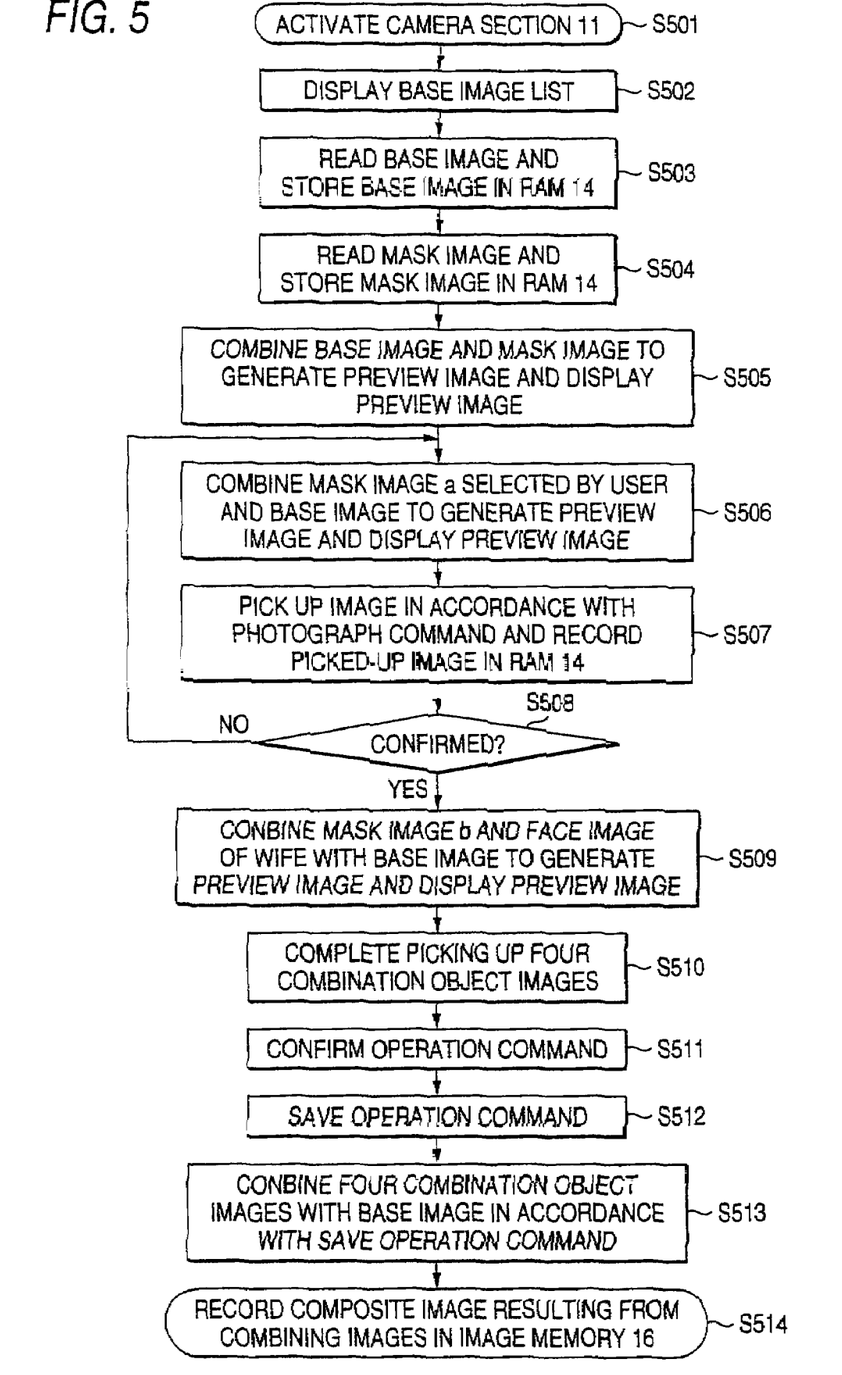
FIG. 5 is a flowchart to describe a flow of image combining processing of a CPU in the image combining mode of the mobile telephone according to the embodiment of the invention.

Next, a flow of image combining processing performed by the CPU 12 will be discussed with reference to display screen examples displayed on the display section 15 and a flowchart. FIGS. 3 and 4 are drawings to describe display screen examples displayed on the display section in the image combining mode. FIG. 5 is a flowchart to describe a flow of image combining processing of the CPU in the image combining mode.

To begin with, when the user of the mobile telephone 1 operates the operation section 18 and enters a start command of the camera section 11, the CPU 12 starts the camera section 11 (S501). Subsequently, when the user selects the image combining mode by operating the operation section, the CPU 12 displays a list of the base images recorded in the image memory 16 on the display section 15 (S502).

When the user selects one base image (here, an image showing two trees and a church) out of the list displayed on the display section 15 and operates "DETERMINE," the CPU 12 reads the base image selected by the user from the image memory 16 and stores the base image in the RAM 14 (S503).

Then, to request the user to select a mask image corresponding to the base image, the CPU 12 reads the mask image data recorded in the mask image memory 17 and stores the mask image data in the RAM 14 (S504), combines the mask image based on the read mask image data and the previously stored base image to generate a preview image, and displays the generated preview image on the display section 15 (S505, see screens 1 and 2 in FIG. 3).

The user can check a plurality of preview images by pressing left and right keys on the operation section 18 as shown in screens 1 and 2 in FIG. 3. Since the four mask images a to d are managed as mask image data of one type representing the four mask images, the preview image is displayed on the preview screen in the form of combining the four mask images a to d with the base image as in screen 2 in FIG. 3.

The user references the preview image displayed on the display and selects the mask image to be used in combining with the base image, which is equivalent to selection of one piece of mask image data from among a plurality of types of mask image data recorded in the mask image memory 17.

When the user operates "DETERMINE" on the screen 2, the CPU 12 combines the mask image specifying the left image pickup area on the screen 2 (FIG. 2a), of the four mask images a to d to generate a preview image, and displays the preview image on the display section 15 (S506, see screen 3 in FIG. 3).

At this time, the gray portions on the screen 2 are image pickup areas where an image can be picked up by the camera section 11 and as the user moves the camera section 11, the video in the circle also moves. That is, in this state, the video picked up by the camera section 11 is displayed as a through image in the circle on the screen 3 in FIG. 3.

While seeing the preview screen displayed on the display section 15, the user focuses the camera section on the face of his wife and performs operation of picking up the face of the wife by the camera section 11 in such a size in which the face of the wife can be recognized clearly. When the user gives a photograph command, the CPU 12 picks up the face of the wife by the camera section 11 and records the picked-up image (image to be combined) in the RAM 14 (S507). Then, the CPU 12 determines whether or not the user confirms the picked-up image (S508).

If the user operates "RETURN" without operating "CONFIRM" (S508: NO) on screen 4 in FIG. 3, the CPU 12 deletes the face image of the wife recorded in the RAM 14 at S507 and goes to S506 and repeats the operation sequence until the user operates "CONFIRM" or enters an image combining mode termination command.

On the other hand, if the user operates "CONFIRM" (S508: YES), the CPU 12 combines the image pickup area specified by the mask image (FIG. 2 b) specifying the upper image pickup area on the screen 2 in FIG. 3 with the base image and further combines the face image of the wife recorded in the RAM 14 at the combining position of the base image specified by the mask image a in FIG. 2 to generate a preview image, and displays the preview image on the display section 15 (S509, see screen 5 in FIG. 3). On the screen 5 in FIG. 3, the face image of the wife recorded in the RAM 14 may not be combined to generate the preview image for display. In this case, the base image and the mask image b are combined to generate a preview image and the preview image is displayed on the display section 15. Through images are displayed in circles on the screen 5 in FIG. 3 as in the circle on the screen 3 in FIG. 3 (image pickup area specified by the mask image a). For the preview image generated by combining another mask image and the base image, a through image is also displayed in the image pickup area specified by the mask image.

Next, the user operates "PHOTOGRAPH" on the screen 5 in FIG. 3 and a face image of the user is picked up and the picked-up face image is recorded in the RAM 14. The CPU 12 determines whether or not the picked-up image is confirmed and as the user operates "CONFIRM" on screen 6 in FIG. 3, the CPU 12 displays the next preview image (preview image generated by combining the mask image c, the face images of the user and his wife, and the base image) on the display section 15. Then, a face image of the farther of the user is picked up and is recorded in the RAM 14 in a similar manner to that described above. An image of the pet dog is also picked up according to similar operation.

As the operation is thus performed as described above, the four combination object images (user's wife, user, user's father, and pet dog) are all picked up (S510, see screen 7 in FIG. 3) and when the user operates "CONFIRM" (S511), the screen makes a transition to screen 8 in FIG. 3. If the user operates "SAVE" on the screen 8 (S512), the CPU 12 combines the four combination object images, picked up by the camera section 11 at the combining positions of the base image based on the mask images (a to d in FIG. 2) to specify the image pickup areas (S513) and last records the composite image in the image memory 16 (S514).

As the operation is thus performed as described above, the composite image having the four face images combined with the base image is generated and is recorded in the image memory 16. The user can display and view the composite image recorded in the image memory 16 on the display section 15 at any time by performing predetermined operation. It is also possible to set the composite image as a standby screen, wallpaper, etc., according to a known art.

The mobile telephone of the embodiment also enables the user to cancel the image combining mode (cancel image pickup on the way) by operating the operation section 18.

When the user performs operation of canceling the image combining mode, the CPU 12 stops the operation of the camera section 11 and whether or not the composite image provided by combining the image to be combined, picked up and confirmed so far and the base image is to be saved. If the user operates "SAVE," the face image picked up and confirmed by the user so far is combined with the base image to generate a composite image and the composite image is recorded in the image memory 16.

Accordingly, it is made possible to change the number of the combination object images with the base image in midstream. On the other hand, if the user operates "TERMINATE" without operating "SAVE," the CPU 12 deletes the combination object images, recorded in the RAM 14 so far and terminates the image combining mode.

In the mobile telephone of the embodiment, when the user picks up and confirms the four combination object images and then operates "SAVE," the four combination object images are combined at the predetermined positions of the base image as shown at S513 in FIG. 5. However, whenever the user picks up and confirms the image to be combined, the CPU 12 may combine the confirmed image to be combined with the base image in order.

That is, the CPU 12 combines the image to be combined with the base image in an overwrite manner each time the image to be combined is picked up and confirmed in such a manner that if the user operates "CONFIRM" on the screen 4 in FIG. 3, the CPU 12 combines the face image of the wife with the base image and that if the user operates "CONFIRM" on the screen 6, the CPU 12 combines the face image of the user with the base image. The composite image resulting from combining the images is stored in the RAM 14. When the four combination object images are all combined with the base image, the composite image is read from the RAM 14 and is recorded in the record memory 16. In doing so, the time required for the composite image generation processing can be shortened as compared with the case where the four combination object images are combined with the base image together last.

The operation of the mobile telephone 1 in generating the composite image has been described. In the mobile telephone according to the embodiment of the invention, further image combining processing can be repeated with the composite image generated according to the operation described above as the base image. This case will be discussed below:

For example, assume that after a composite image as on the screen 8 in FIG. 3 is generated and saved and is set as a standby screen of the mobile telephone 1, the user gets tired of the composition of the screen 8 and wants to change the background (base image) of the screen 8. In this case, the mobile telephone in the related art does not allow the user to change the background image of the composite image displayed on the screen 8.

Then, even in such a case, the mobile telephone 1 according to the embodiment enables the user to easily change the background image (base image) of the image displayed on the screen 8.

To change the background of the composite image displayed on the screen 8, in the image combining mode, the user may select the composite image recorded in the image memory as the base image at S514 in FIG. 5 and further select the mask image e based on the mask image data recorded in the mask image memory 17.

That is, the user may select the screen of preview display into which the mask image e and the base image are combined as shown on screen 9 in FIG. 4 and may operate "DETERMINE" and then may pick up a night view based on the image pickup area of the area other than the four face images as on screen 10, and may operate "CONFIRM" and "SAVE" to combine the night view image and the four face images and record a composite image as displayed on screen 11 in the image memory 16.

In doing so, the combination of the four face images and the background image thereof can be changed easily. Using the composite image as displayed on the screen 8 as a base image, the mask image f, g, etc., in FIG. 2 can also be selected for generating an entirely different composite image without using the mask image e provided by inverting the mask image into which the mask images a to d are combined, as described above.

That is, according to the embodiment, a large number of types of composite images can be generated according to combinations of base images and mask images, so that the user can obtain a highly original composite image and can also obtain a composite image of which the user does not get tired.

According to the embodiment, a plurality of mask images are managed as one mask image data and are recorded in the mask image memory 17. The image pickup areas specified by the plurality of mask images a to d based on the mask image data are independent of each other, so that it is made possible to set different image pickup conditions (distance from subject at the image pickup time, etc.) for each of the image pickup areas.

Therefore, to combine four face images with one base image for display as in the embodiment, when image pickup based on four image pickup areas is performed, image pickup based on each image pickup area is performed under a different image pickup condition, whereby the four face images can be picked up in almost equal size and all face images can be sharply recognized in the composite image.

The expression of "a combination object image holding unit holds the combination object image" in claims means that the user operates "CONFIRM" mentioned in the embodiment. That is, the point in time when the user operates "CONFIRM" on the screen 4 in FIG. 3 corresponds to the point in time when the combination object image holding unit holds the combination object image in claims.

Although the invention has been described in detail with reference to the specific embodiment, it will be obvious to those skilled in the art that various changes and modifications can be made in the invention without departing from the spirit and the scope thereof.

This application is based on Japanese Patent Application No. 2002-286403 filed on Sep. 30, 2002, the contents of which are incorporated herein by reference.

INDUSTRIAL APPLICABILITY

According to the invention, the mobile telephone having the image processing function capable of generating a highly flexible composite image can be provided.

The invention claimed is:

1. A mobile telephone including an image pickup unit and a base image record section for recording a base image, and having an image processing function of combining a combination object image picked up by the image pickup unit and the base image to generate a composite image, the mobile telephone comprising:

a composite image record section which records the composite image;

a mask image data record section which records a plurality of types of mask image data representing mask images to specify a combining position of the combination object image to be combined with the base image on the base image and an image pickup area for picking up the combination object image by the image pickup unit, the mask image data corresponding to the base image;

a reading unit which reads the mask image data selected from among the plurality of types of mask image data from the mask image data record section;

a display unit which displays a preview image generated by combining the base image and the mask image based on the mask image data read by the reading unit on a display, wherein the displayed preview image shows the image pickup area on the base image such that the base image surrounds the displayed image pickup area, and wherein subsequent to displaying the preview image, the display unit displays the composite image showing the combination object image as a through image on the base image and located within the image pickup area;

a combination object image holding unit which holds the combination object image which is picked up in accordance with the mask image of the preview image displayed on the display;

an image combining unit which combines the combination object image held by the combination object image holding unit with the base image at the combining position specified by the mask image data; and a recording unit which records a composite image combined by the image combining unit in the composite image record section, wherein the plurality of types of mask image data recorded in the mask image data record section include the mask image data representing a plurality of types of mask images corresponding to the base image;

wherein the display unit one at a time sequentially displays on the base image the plurality of types of mask images corresponding to the base image, and each of the sequentially displayed mask images is displayed with the base image until its corresponding combination object image is picked-up and held, and each of the sequentially displayed mask images is one at a time sequentially displayed with the base image and all previously picked-up and held combination object images that correspond to one of the sequentially displayed mask images;

wherein the combination object image holding unit holds a plurality of combination object images which are picked up in accordance with the plurality of types of mask images displayed on the display; and wherein the image combining unit combines each of the plurality of combination object images, held by the combination object image holding unit, with the base image at the combining position based on the mask image to specify the image pickup area of the combination object image.

2. The mobile telephone as set forth in claim 1 wherein the preview image is generated by combining the base image and the each of the plurality of mask images on the display when the display unit displays each of the plurality of mask images on the display.

3. The mobile telephone as set forth in claim 2 wherein when the combination object image which is picked up based on each of a plurality of types of image pickup areas specified by the mask image data is already held in the combination object image holding unit, the display unit combines the held combination object image with the base image at the combining position based on the mask image to specify the image pickup area for picking up the held combination object image and displays the composition image on the display.

4. The mobile telephone as set forth in claim 1 wherein whenever the image pickup unit picks up an image based on the mask image displayed on the display and the picked-up combination object image is held by the combination object image holding unit, the image combining unit combines the held combination object image with the base image in order; and wherein after the image combining unit combines all the combination object images with the base image, the recording unit records a composite image provided by the image combining unit in the composite image record section.

5. The mobile telephone as set forth in claim 1 wherein when a picking up of the combination object image to be combined with the base image is canceled on the way, the image combining unit combines the combination object image, which is picked up by the image pickup unit and which is held by the combination object image holding unit before the picking up of the image is canceled, with the base image.

6. The mobile telephone as set forth in claim 1, wherein each of the sequentially displayed mask images is automatically one at a time sequentially displayed with the base image and all previously picked-up and held combination object images that correspond to one of the sequentially displayed mask images.

* * * * *

UNITED STATES PATENT AND TRADEMARK OFFICE
CERTIFICATE OF CORRECTION

PATENT NO. : 7,652,693 B2 Page 1 of 1
APPLICATION NO. : 10/529407
DATED : January 26, 2010
INVENTOR(S) : Miyashita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 948 days.

Signed and Sealed this

Twenty-third Day of November, 2010

David J. Kappos
*Director of the United States Patent and Trademark Office*